(No Model.)
J. H. RACER.
HEDGE FENCE.
No. 384,713. Patented June 19, 1888.
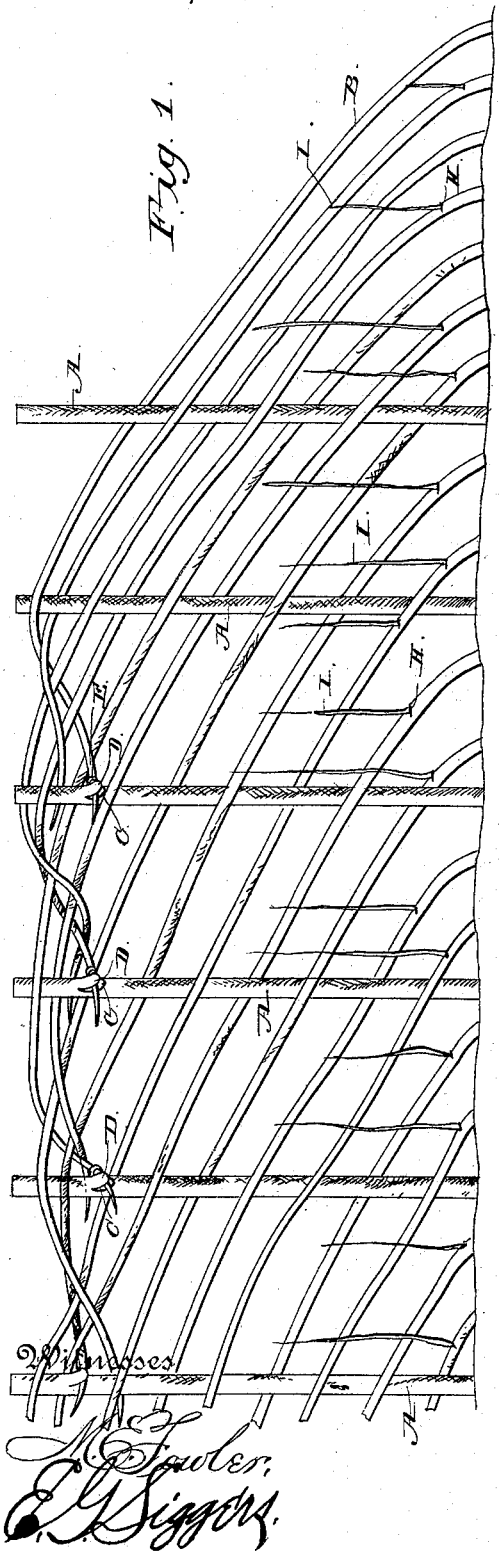
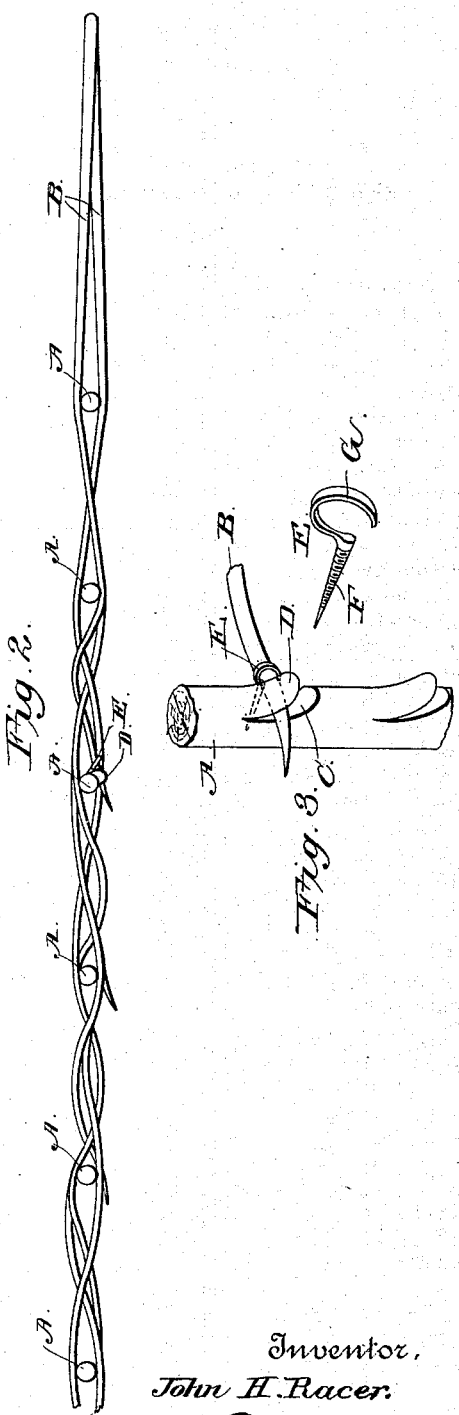
Inventor,
John H. Racer.

UNITED STATES PATENT OFFICE.

JOHN H. RACER, OF BELLBROOK, OHIO.

HEDGE FENCE.

SPECIFICATION forming part of Letters Patent No. 384,713, dated June 19, 1888.

Application filed September 20, 1887. Serial No. 250,235. (No model.)

*To all whom it may concern:*

Be it known that I, JOHN H. RACER, a citizen of the United States, residing at Bellbrook, in the county of Greene and State of Ohio, have invented a new and useful Improvement in Hedge Fences, of which the following is a specification.

My invention relates to an improvement in hedge fences; and it consists in the peculiar construction and arrangement of devices, that will be more fully set forth hereinafter, and particularly pointed out in the claim.

In the accompanying drawings, Figure 1 is an elevation of a hedge fence embodying my improvements. Fig. 2 is a top plan view of the same. Fig. 3 is a detached perspective view illustrating the manner of attaching the inclined plants to the vertical supporting-plants.

A represents a series of supporting posts or stakes, which are arranged in line, are parts of the hedge, and are growing hedge-plants. If preferred, however, ordinary posts or stakes may be employed instead of the vertical growing plants A. In between the vertical plants A, in line therewith and at suitable regular distances apart, (usually about four inches,) are planted growing hedge-plants B, which are inclined, as shown, and are caused to intersect the vertical plants A and to bear against the opposite sides of each alternate plant A, and the upper portions of the inclined plants are arranged in substantially a horizontal line along the top of the hedge, and are intertwined in a similar manner to that employed in weaving baskets and wicker-work. At the points where the inclined plants B bear against the vertical supporting-plants A the latter are provided with downwardly and outwardly inclined slits C, thereby forming lips D. The plants B are fitted in the slits C and the lips D bear upon the said plants, and thereby retain the same firmly in place. In order to retain the plants B in the slits C while the plants A and B are growing together, I provide hooks E, having stems F, which are driven into the plants A, and eyes or loops G at their outer ends, which are bent around the plants B, as shown at Fig. 3.

By weaving the upper ends of the plants B together at the top of the hedge and extending them in substantially a horizontal line the top of the hedge is rendered very dense in form and appearance, and serves to discourage horses or cattle from attempting to jump over the same. In order to render the lower portion of the hedge as dense as the upper portion thereof, and prevent even small animals from forcing their way through the hedge, I make slits or notches H in the inclined plants B near their lower ends, and thereby cause shoots or branches I to grow vertically from the inclined plants at this point, as shown at Fig. 1.

The hooks are intended to remain in place only until the wounds by natural growth and the closure which is common to all living tissue embrace and hold, almost as if integrally, the ends of the corresponding inclined plants. The function of the hooks is to prevent said ends from spreading the wounds and retarding the closure of the same.

The shoots I, when grown to sufficient size, form a body to the lowest part of the fence impenetrable to hogs, sheep, and animals of the kind.

Having thus described my invention, I claim—

The combination, in a hedge fence, of the vertically-growing aligned plants A, having lips made by upwardly-inclined incisions in their sides, the inclined plants B, bent across said vertical plants and having their end portions inserted in the wounds formed by said incisions, and the retaining-hooks having their shanks driven into the vertical plants and embracing the inclined plants, for the purpose of preventing the latter from spreading the wounds in the vertical plants, substantially as specified.

In testimony that I claim the foregoing as my own I have hereto affixed my signature in presence of two witnesses.

JOHN H. RACER.

Witnesses:
 JOHN EWING,
 H. L. SMITH.